United States Patent
Johnson et al.

(10) Patent No.: US 8,910,253 B2
(45) Date of Patent: *Dec. 9, 2014

(54) PICTURE GESTURE AUTHENTICATION

(71) Applicant: Microsoft Corporation, Redmond, WA (US)

(72) Inventors: Jeffrey Jay Johnson, Bellevue, WA (US); Steve Seixeiro, Snohomish, WA (US); Zachary Pace, Seattle, WA (US); Giles van der Bogert, Renton, WA (US); Sean Gilmour, Issaquah, WA (US); Levi Siebens, Bothell, WA (US); Kenneth Tubbs, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,594

(22) Filed: Oct. 19, 2012

(65) Prior Publication Data

US 2013/0047252 A1    Feb. 21, 2013

Related U.S. Application Data

(63) Continuation of application No. 13/163,201, filed on Jun. 17, 2011, now Pat. No. 8,650,636.

(30) Foreign Application Priority Data

May 24, 2011   (AU) ................ 2011202415

(51) Int. Cl.
- *G06F 17/30*  (2006.01)
- *G06F 3/01*   (2006.01)
- *H04L 9/32*   (2006.01)
- *G06F 21/36*  (2013.01)

(52) U.S. Cl.
CPC   *G06F 21/36* (2013.01); *G06F 3/01* (2013.01); *H04L 9/3226* (2013.01)
USPC ...................................... 726/5; 726/3; 726/4

(58) Field of Classification Search
CPC ........... G06F 21/36; G06F 3/01; G06F 21/31; G06F 21/6218; G06F 2221/2141; G06F 2221/2113; G06F 21/10; H04L 9/3226; B60R 5/047
USPC .......................................... 726/17, 5, 1, 2, 4
See application file for complete search history.

(56) References Cited

U.S. PATENT DOCUMENTS

| | | | |
|---|---|---|---|
| 5,224,179 A | 6/1993 | Denker et al. | |
| 5,465,084 A | 11/1995 | Cottrell | |

(Continued)

FOREIGN PATENT DOCUMENTS

| | | |
|---|---|---|
| CN | 201569981 | 9/2010 |
| DE | 10024179 | 11/2001 |

(Continued)

OTHER PUBLICATIONS

Dias et al, A Comparative Evaluation of Finger-Drawn Graphical Password Verification Methods, 2010.*

(Continued)

*Primary Examiner* — Andy Rao
*Assistant Examiner* — Shan Elahi
(74) *Attorney, Agent, or Firm* — Bryan Webster; Kate Drakos; Micky Minhas

(57) ABSTRACT

In one embodiment, a picture signature password system may use a picture signature password to determine access to a computing device or service. A display screen 172 may display a personalized digital image 310. A user input device 160 may receive a user drawing set executed by a user over the personalized digital image 310. A processor 120 may authenticate access to the user session if the user drawing set matches a library drawing set associated with the user.

20 Claims, 10 Drawing Sheets

(56) References Cited

U.S. PATENT DOCUMENTS

| | | | |
|---|---|---|---|
| 5,485,531 A | 1/1996 | Ichinohe et al. | |
| 5,539,840 A | 7/1996 | Krtolica et al. | |
| 5,559,961 A | 9/1996 | Blonder | |
| 5,608,387 A | 3/1997 | Davies | |
| 5,778,069 A | 7/1998 | Thomlinson et al. | |
| 6,075,905 A | 6/2000 | Herman et al. | |
| 6,118,872 A | 9/2000 | Kashima et al. | |
| 6,185,316 B1 | 2/2001 | Buffam | |
| 6,209,104 B1 | 3/2001 | Jalili | |
| 6,278,453 B1* | 8/2001 | Bodnar | 715/764 |
| 6,393,305 B1 | 5/2002 | Ulvinen et al. | |
| 6,516,092 B1 | 2/2003 | Bachelder et al. | |
| 6,720,860 B1 | 4/2004 | Narayanaswami | |
| 6,788,304 B1 | 9/2004 | Hart et al. | |
| 6,868,190 B1 | 3/2005 | Morton | |
| 6,934,860 B1 | 8/2005 | Goldstein | |
| 6,948,068 B2 | 9/2005 | Lawandy et al. | |
| 6,958,759 B2 | 10/2005 | Safadi et al. | |
| 6,959,394 B1 | 10/2005 | Brickell et al. | |
| 7,219,368 B2 | 5/2007 | Juels et al. | |
| 7,240,367 B2 | 7/2007 | Park | |
| 7,243,239 B2 | 7/2007 | Kirovski et al. | |
| 7,257,241 B2 | 8/2007 | Lo | |
| 7,279,646 B2 | 10/2007 | Xu | |
| 7,383,570 B2 | 6/2008 | Pinkas et al. | |
| 7,536,556 B2 | 5/2009 | Federova et al. | |
| 7,593,000 B1 | 9/2009 | Chin | |
| 7,657,849 B2 | 2/2010 | Chaudhri et al. | |
| 7,734,930 B2 | 6/2010 | Kirovski et al. | |
| 7,743,256 B2 | 6/2010 | Yang | |
| 7,793,108 B2 | 9/2010 | Narayanaswami et al. | |
| 7,873,382 B2 | 1/2011 | Rydgren et al. | |
| 7,941,834 B2 | 5/2011 | Beck et al. | |
| 7,953,983 B2 | 5/2011 | Holt et al. | |
| 8,024,775 B2 | 9/2011 | Xu et al. | |
| 8,286,102 B1* | 10/2012 | Wilensky | 715/863 |
| 8,458,485 B2 | 6/2013 | Bandyopadhyay et al. | |
| RE44,725 E | 1/2014 | Holt et al. | |
| 8,650,636 B2 | 2/2014 | Johnson et al. | |
| 2001/0037468 A1 | 11/2001 | Gaddis | |
| 2001/0044906 A1 | 11/2001 | Kanevsky et al. | |
| 2002/0029341 A1 | 3/2002 | Juels et al. | |
| 2003/0093699 A1 | 5/2003 | Banning et al. | |
| 2003/0128396 A1 | 7/2003 | Fan | |
| 2004/0010722 A1 | 1/2004 | Ha | |
| 2004/0034801 A1 | 2/2004 | Jaeger | |
| 2004/0169638 A1 | 9/2004 | Kaplan | |
| 2004/0193882 A1 | 9/2004 | Singerle | |
| 2004/0230843 A1 | 11/2004 | Jansen | |
| 2004/0260955 A1 | 12/2004 | Mantyla | |
| 2005/0141747 A1 | 6/2005 | Shi et al. | |
| 2005/0210417 A1* | 9/2005 | Marvit et al. | 715/863 |
| 2006/0010400 A1 | 1/2006 | Dehlin et al. | |
| 2006/0174339 A1 | 8/2006 | Tao | |
| 2006/0206717 A1 | 9/2006 | Holt et al. | |
| 2006/0206918 A1 | 9/2006 | McLean | |
| 2007/0016958 A1 | 1/2007 | Bodepudi et al. | |
| 2007/0047772 A1 | 3/2007 | Matey et al. | |
| 2007/0071285 A1 | 3/2007 | Kontsevich | |
| 2007/0115091 A1 | 5/2007 | Bandaru | |
| 2007/0150842 A1 | 6/2007 | Chaudhri et al. | |
| 2007/0277224 A1 | 11/2007 | Osborn | |
| 2008/0230598 A1 | 9/2008 | Bodin | |
| 2008/0244013 A1* | 10/2008 | Kropivny | 709/206 |
| 2008/0244700 A1* | 10/2008 | Osborn et al. | 726/2 |
| 2008/0263361 A1 | 10/2008 | Dutta et al. | |
| 2009/0038006 A1 | 2/2009 | Traenkenschuh et al. | |
| 2009/0055910 A1 | 2/2009 | Lee | |
| 2009/0083847 A1* | 3/2009 | Fadell et al. | 726/16 |
| 2009/0085936 A1 | 4/2009 | Chen et al. | |
| 2009/0094247 A1 | 4/2009 | Fredlund et al. | |
| 2009/0138725 A1 | 5/2009 | Madhvanath et al. | |
| 2009/0172810 A1 | 7/2009 | Won et al. | |
| 2009/0199295 A1 | 8/2009 | Shih et al. | |
| 2009/0210939 A1 | 8/2009 | Xu et al. | |
| 2009/0244013 A1* | 10/2009 | Eldershaw | 345/173 |
| 2009/0259855 A1 | 10/2009 | de Cesare et al. | |
| 2009/0313693 A1 | 12/2009 | Rogers | |
| 2010/0013762 A1 | 1/2010 | Zontrop et al. | |
| 2010/0031200 A1 | 2/2010 | Chen | |
| 2010/0043062 A1 | 2/2010 | Alexander et al. | |
| 2010/0128002 A1* | 5/2010 | Stacy et al. | 345/174 |
| 2010/0131294 A1* | 5/2010 | Venon et al. | 705/3 |
| 2010/0156843 A1* | 6/2010 | Paleczny et al. | 345/174 |
| 2010/0180336 A1 | 7/2010 | Jones et al. | |
| 2010/0186074 A1 | 7/2010 | Stavrou et al. | |
| 2010/0211551 A1 | 8/2010 | Ryu | |
| 2010/0223276 A1 | 9/2010 | Al-Shameri et al. | |
| 2010/0250937 A1 | 9/2010 | Blomquist et al. | |
| 2010/0322485 A1* | 12/2010 | Riddiford | 382/115 |
| 2010/0325721 A1 | 12/2010 | Bandyopadhyay et al. | |
| 2010/0328201 A1* | 12/2010 | Marvit et al. | 345/156 |
| 2011/0016405 A1* | 1/2011 | Grob et al. | 715/740 |
| 2011/0031139 A1 | 2/2011 | Macor | |
| 2011/0156867 A1* | 6/2011 | Carrizo et al. | 340/5.85 |
| 2011/0197259 A1 | 8/2011 | Thibadeau et al. | |
| 2011/0247067 A1* | 10/2011 | Hirose | 726/19 |
| 2012/0123920 A1 | 5/2012 | Fraser et al. | |
| 2012/0126940 A1* | 5/2012 | Coggill | 340/5.54 |
| 2012/0166944 A1* | 6/2012 | Cotterill | 715/702 |
| 2012/0304284 A1 | 11/2012 | Johnson et al. | |
| 2013/0247171 A1 | 9/2013 | Bandyopadhyay et al. | |

FOREIGN PATENT DOCUMENTS

| | | | | |
|---|---|---|---|---|
| EP | 2150915 | | 10/2010 | |
| EP | 2466513 A1 * | | 6/2012 | G06F 21/20 |
| EP | 2466518 A1 * | | 6/2012 | G06F 21/20 |
| KR | 100856919 | | 9/2008 | |
| TW | 201026004 | | 7/2010 | |
| WO | WO0177792 | | 10/2001 | |
| WO | WO-2009022242 | | 2/2009 | |
| WO | WO-2011100017 | | 8/2011 | |

OTHER PUBLICATIONS

"Advisory Action", U.S. Appl. No. 12/485,952, filed Oct. 12, 2012, 3 pages.

"Drawing Passwords", *IBM Technical Disclosure Bulletin, International Business Machines Corp*, vol. 40, No. 5 (May 1, 1997), pp. 201-203.

"Extended European Search Report", EP Application No. 09711593, (Jun. 9, 2011), 7 pages.

"Final Office Action", U.S. Appl. No. 10/187,311, (May 1, 2006), 21 pages.

"Final Office Action", U.S. Appl. No. 11/073,742, (Mar. 25, 2010), 14 pages.

"Final Office Action", U.S. Appl. No. 11/073,742, (May 12, 2009), 17 pages.

"Final Office Action", U.S. Appl. No. 12/485,952, (Jul. 24, 2012), 22 pages.

"Foreign Notice of Allowance", Application No. 2011202415, (Mar. 28, 2012), 3 pages.

"Foreign Notice of Allowance", EP Application No. 09711593.5, (Aug. 6, 2012), 8 pages.

"Foreign Office Action", Australian Application No. 2011202415, (Feb. 22, 2012), 1 page.

"Foreign Office Action", Australian Application No. 2011202415, (Nov. 24, 2011), 2 pages.

"International Search Report", Application No. PCT/US2009/032771, (Aug. 27, 2009), 3 pages.

"International Search Report", PCT Application No. PCT/US10/58825, (Feb. 2, 2011), 1 page.

"International Search Report", PCT Application No. PCT/US2011/055507, (Apr. 10, 2012), 9 pages.

"Non-Final Office Action", U.S. Appl. No. 12/034,254, (Dec. 22, 2010), 11 pages.

"Non-Final Office Action", U.S. Appl. No. 10/187,311, (Oct. 17, 2006), 19 pages.

"Non-Final Office Action", U.S. Appl. No. 10/187,311, (Nov. 7, 2005), 17 pages.

(56) References Cited

OTHER PUBLICATIONS

"Non-Final Office Action", U.S. Appl. No. 11/073,742, (Aug. 25, 2010), 14 pages.
"Non-Final Office Action", U.S. Appl. No. 11/073,742, (Oct. 14, 2009), 14 pages.
"Non-Final Office Action", U.S. Appl. No. 11/073,742, (Oct. 16, 2008), 15 pages.
"Non-Final Office Action", U.S. Appl. No. 11/775,159, (Jul. 23, 2009), 17 pages.
"Non-Final Office Action", U.S. Appl. No. 11/775,159, (Dec. 18, 2008), 16 pages.
"Non-Final Office Action", U.S. Appl. No. 12/485,952, (Dec. 1, 2011), 14 pages.
"Non-Final Office Action", U.S. Appl. No. 13/163,201, (Oct. 10, 2012), 28 pages.
"Non-Final Office Action", U.S. Appl. No. 13/409,877, (Aug. 1, 2012), 6 pages.
"Notice of Allowance", U.S. Appl. No. 10/187,311, (Mar. 1, 2007), 7 pages.
"Notice of Allowance", U.S. Appl. No. 11/073,742, (Feb. 22, 2011), 12 pages.
"Notice of Allowance", U.S. Appl. No. 11/775,159, (Jan. 22, 2010), 8 pages.
"Notice of Allowance", U.S. Appl. No. 12/034,254, (Jul. 6, 2011),11 pages.
"Notice of Allowance", U.S. Appl. No. 12/034,254, (Aug. 18, 2011), 13 pages.
"Restriction Requirement", U.S. Appl. No. 12/485,952, (Sep. 2, 2011), 5 pages.
"Supplemental Notice of Allowance", U.S. Appl. No. 12/034,254, (Aug. 18, 2011), 10 pages.
"Ultra-Mobile PC Your life. At the touch of your finger.", Retrieved at <http://www.microsoft.com/windows/products/winfamily/umpc/default.mspx> on Mar. 25, 2011, 1 page.
"Written Opinion", Application No. PCT/US2009/032771, (Aug. 20, 2010), 3 pages.
Angeli, et al., "Usability and User Authentication: Pictorial Passwords vs. Pin", Retrieved at <http://www.antonella_de_angeli._talktalk.neUfiles/PDF/USABILITY%20AND%20U_SER%20AUTHENTICATION%20PICTORIA1L%20PASSWORDS%20VS%20PIN.pdf>, (2003),6 pages.
Ballard, "Generalizing the hough transform to detect arbitrary shapes", *Pattern Recognition*, vol. 13, No. 2, (1981),pp. 111-122.
Bishop, et al., "Improving System Security via Proactive Password Checking", *Computers and Security*, vol. 14, No. 3, (1995),pp. 233-249.
Brostoff, "Are Passfaces More Usable than Passwords a Field Trial Investigation", *SIGSAC ACM Special Interest D Group on Securit, Audit and Control*, (2001),20 pages.
Chalkias, et al., "Multi-Grid Graphical Password Scheme", *Proceedings of the 6th International Conference on Artificial Intelligence and Digital Communications (AIDC)*, 2006,pp. 81-90.
Curtis, et al., "Computer Generated Watercolor", *SIGGRAPH '97*, Los Angeles, CA, (Aug. 1997),10 pages.
De Angeli, et al., "Is a Picture Really Worth a Thousand Words? Exploring the Feasibility of Graphical Authentication Systems", *International. Journal of Human-Computer Studies*, (2005),34 pages.
Dhamija, Rachna "Hash Visualization in User Authentication", *Proceedings of the Computer Human Interaction 2000 Conference*, (Apr. 2000),2 pages.
Dhamija, Rachna et al., "Deja Vu: A User Study Using Images for Authentication", *9th USENIX security symposium*, (2000),14 pages.
Dirik, et al., "Modeling User Choice in the PassPoints Graphical Password Scheme", *ACM, Symposium on Usable Privacy and Security (SOUPS)*, (Jul. 2007),9 pages.
Doja, et al., "Virtual Password: Virtual Environment Based User Authentication", Retrieved at <http://nguyendangbinh.org/Proceedings/IPCV08/Papers/SAM4029.pdf>, (Jul. 14-17, 2008),6 pages.
Du, et al., "A Scalable Integrated Region-Based Image Retrieval System", 0-7803-6725-1 *IEEE*, Available at <http://ieeexplore.ieee.org/xpl/login.jsp?tp=&arnumber=958943&url=http%3A%2F%2Fieeexplore.ieee.org%2Fxpls%2Fabs_all.jsp%3Farnumber%3D958943>,(2001),4 pages.
Feldmeier, David et al., "UNIX Password Security Ten Years Later", *Proceedings of Crypto'89, published as Lecture Notes in Computer Science, No. 435, Spring Verlage*, (1989),20 pages.
Hoff, Kenneth E., et al., "Fast Computation of Generalized Voronoi Diagrams Using Graphics Hardware", *ACM*, (1999),10 pages.
Jansen, et al., "Picture Password: A Visual Login Technique for Mobile Devices", Retrieved at <http://csrc.nist.gov/publications/nistir/nistir-7030.pdf>, (Jul. 2003),20 pages.
Jansen, Wayne "Authenticating Mobile Device Users Through Image Selection", Retrieved at <http://csrc.nist.gov/_groups/SN_S/mobile_security/documents/mobile_devices/PP-Visua1Authentication-rev-DS04.pdf>, (2004),10 pages.
Jermyn, et al., "The Design and Analysis of Graphical Passwords", *Proceedings of the 8th USENIX Security Symposium, Washington, D.C., USA*, Retrieved at <http://www.usenix.org/events/sec99/full_papers/jermyn/jermyn.pdf>,(Aug. 23, 1999-Aug. 26, 1999),15 pages.
Juels, ARI "At the Juncture of Cryptography and Humanity", *RSA Laboratories*, (2002),pp. 1-4.
Kara, et al., "Hierarchical Parsing and Recognition of Hand-Sketched Diagrams", *In UIST '04: Proceedings of the 17th Annual ACM Symposium on User Interface Software and Technology*, (2004),10 pages.
Khandelwal, et al., "User Authentication by Secured Graphical Password Implementation",Retrieved at <http://ieeexplore.ieee.org/xpl/freeabs_all.jsp?arnumber=4653531>, (Nov. 25, 2010),100-104.
Klein, "Foiling the Cracker a Survey of and Improvements to, Password Security", *Proceedings of the Second USENIX Security Workshop*, (Aug. 2, 1990),11 pages.
Lipton, "Logical Authentication Methods", (1986),pp. 9-20.
Morris, Robert et al., "Password Security a Case History", *Communications of the ACM*, vol. 22, No. 11, (Nov. 1979),pp. 594-597.
Nali, et al., "Analyzing User Choice in Graphical Passwords", <<http://www.scs.carleton.ca/research/5_tech_reports/2004/TR-04-01.pdf>>*Technical Report, School of Information Technology an D Engineering, Univ of Ottawa*, Canada (May 27, 2004),6 pages.
Naveen, Sundar G., et al., "Password Management Using Doodles", *ICMI 2007 Proceedings of the 9th International Conference on Multimodal Interfaces*, (Nov. 15, 2007),5 pages.
Oka, "A New Cellular Automaton Structure for Macroscopic Linear-Curved Features Extraction", *Proceedings of the 4th International Joint Conference on Pattern Recognition*, Kyoto, Japan, (1978),pp. 654-656.
Oka, et al., "Scribble-a-Secret: Similarity-Based Password Authentication Using Sketches", *19th International Conference on Pattern Recognition*, 2008, Retrieved at <http://figmenl.cse.usf.edu/-sfefilal/data/papers/ThAT9.40.pdf>,(2008),4 pages.
Paulson, Linda D., "Taking a Graphical Approach to the Password", *News Briefs*, (Jul. 2002),1 page.
Perlin, "An Image Synthesizer", *Computer Graphics*, vol. 19, No. 3, (Jul. 1985),pp. 287-296.
Perra, C "A Framework for Image Based Authentication", Retrieved at <<http://ieeexplore.ieee.org/stamp/stamp.jsp?tp=&arnumber=1415456&isnumber=30651>>, *Proceedings*, vol. 2, (Mar. 2005),pp. 521-524
Perrig, et al., "Hash Visualization a New Technique to Improve Real World Security", *Proceedings of the 1999 International Workshop on Cryptographic Techniques and E Commerce*, (1999),pp. 131-138.
Sobrado, Leonardo et al., "Graphical Passwords", (2002),8 pages.
Sun, et al., "An Interactive and Secure User Authentication Scheme for Mobile Devices", Retrieved at <http://ieeexplore.ieee.org/xpl/freeabs_all.jsp?arnumber=4542082>, IEEE International Symposium on Circuits and D Systems,(May 2008),2973-2976.
Suo, et al., "Graphical Passwords: A Survey", found at <<http://www.acsa-admin.org/2005/papers/89.pdf>>, *21st Annual Computer Security Applications Coni (ACSA05)*, (2005),10 pages.

(56) References Cited

OTHER PUBLICATIONS

Takada, Tetsuji et al., "Awase-E: Image-based Authentication for Mobile Phones using User's Favorite Images", Retrieved at: <<http://www.netaro.info/-zetaka/publications/papers/awasee-MobileHCI03.pdf>>, *Proceedings of 5th International Symposium on Human Computer Interaction with Mobile Devices and Services*(*Mobile HCI* 03), (Sep. 2003),5 pages.

Varenhorst, "Passdoodles: a Lightweight Authentication Method", retrieved from the internet on May 25, 2011 at <<http://people.csail.mil.edu/emax/papers/varenhorst.pdf>>, (May 15, 2005),14 pages.

Venkatesan, R et al., "Robust Image Hashing", *IEEE* 2000, (2000),3 pages.

Wang, et al., "SIMPLicity: Semantics-Sensitive Integrated Matching for Picture Libraries", *IEEE Transactions on Pattern Analysis and Machine Intelligence*, vol. 23, No. 9, Available at <http://ieeexplore.ieee.org/xpl/login.jsp?tp=&arnumber=955109&url=http%3A%2F%2Fieeexplore.ieee.org%2Fiel5%2F34%2F20661%2F00955109.pdf%3Farnumber%3D955109>,(Sep. 2001),17 pages.

Wertheimer, "Laws of Organization in Perceptual Forms", *A Source Book of Gestalt Psychology, Chapter 5, Routledge and Kegan Paul Ltd.*, (1938),pp. 71-88.

Wiedenbeck, et al., "Authentication Using Graphical found at Passwords: Effects of Tolerance and Image Choice", found at 8 <<http://www.gbtn.org/-chlee/research/phishing/p1-wiedenbeck.pdf>>,*Symposium on Usable Privacy and Security D* (*SOUPS*), (Jul. 2005),12 pages.

Wood, et al., "The Rorschach Inkblot Test: A Case of Overstatement", *Assessment*, vol. 6, No. 4, pp. 341-351.

Yan, Jianxin et al., "The memorability and security of passwords—some empirical results", *Technical Report, University of Cambridge, Computer Laboratory*, (Sep. 2000),13 pages.

Yan, Jianzin J., "A Note on Proactive Password Checking", *ACM* (2002),9 pages.

"Final Office Action", U.S. Appl. No. 13/163,201, (May 2, 2013), 32 pages.

"Final Office Action", U.S. Appl. No. 13/409,877, (Jan. 23, 2013), 7 pages.

"Non-Final Office Action", U.S. Appl. No. 11/775,159, (Jul. 23, 2009),17 pages.

"Non-Final Office Action", U.S. Appl. No. 11/775,159, (Dec. 18, 2008),16 pages.

"Notice of Allowance", U.S. Appl. No. 12/485,952, (Feb. 1, 2013), 6 pages.

"Notice of Allowance", U.S. Appl. No. 12/485,952, (Nov. 29, 2012), 6 pages.

"Supplemental Notice of Allowance", U.S. Appl. No. 13/163,201, Nov. 26, 2013, 12 pages.

"Notice of Allowance", U.S. Appl. No. 13/163,201, (Sep. 24, 2013),16 pages.

"Notice of Allowance", U.S. Appl. No. 13/409,877, (Aug. 30, 2013), 8 pages.

"First Examination Report", NZ Application No. 618124, May 14, 2014, 2 pages.

"Foreign Notice of Allowance", NZ Application No. 618124, Aug. 22, 2014, 1 page.

\* cited by examiner

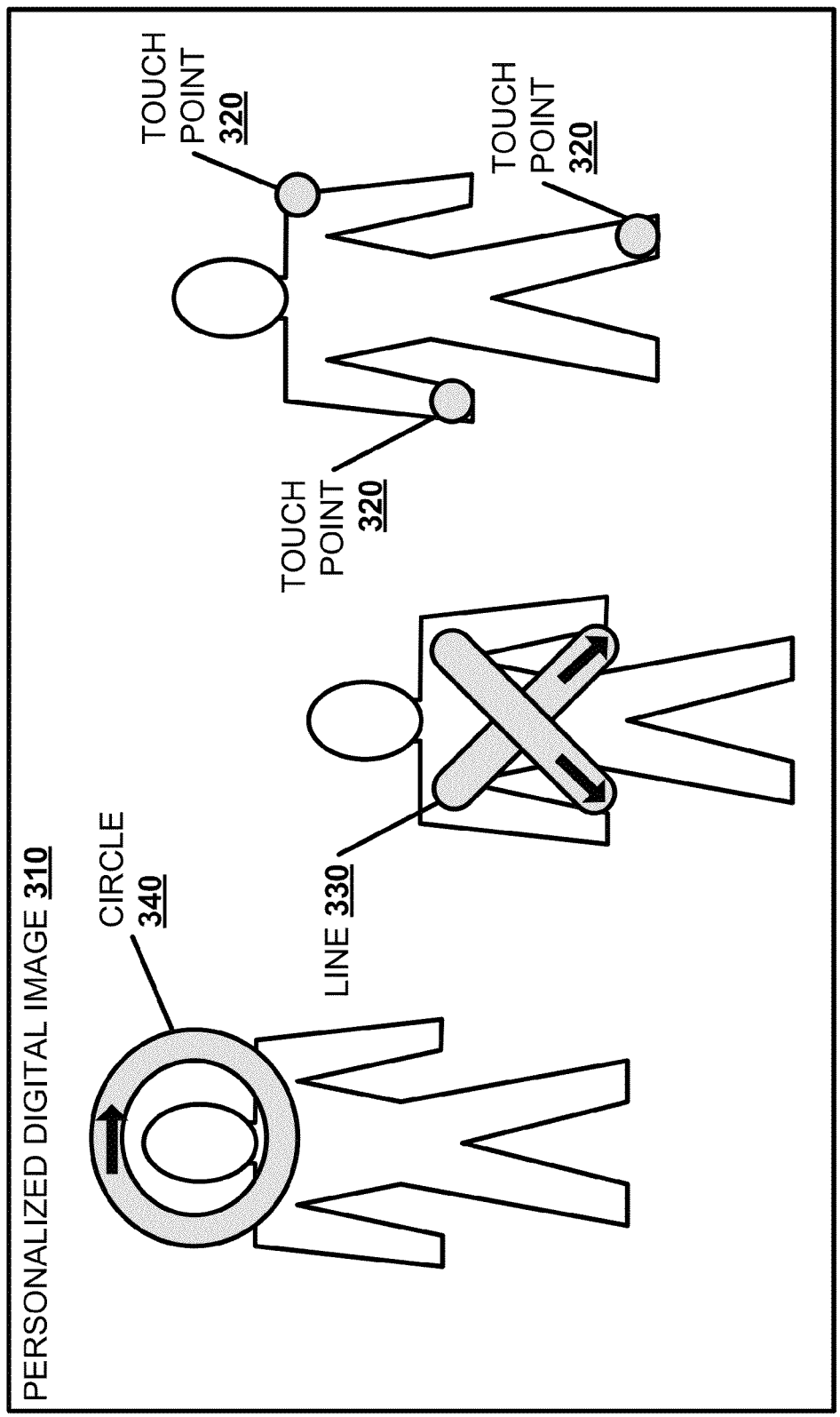

| USER ID 402 | SETTING 404 | IMAGE 406 | LDSM 408 | TYPE 410 | LPS 412 | PT 414 | TIMING 416 |
|---|---|---|---|---|---|---|---|

| USER ID 402 | SETTING 404 | IMAGE 406 | LDSM 408 | TYPE 410 | LPS 412 | PT 414 | LVS 422 | VT 424 | TIMING 416 |
|---|---|---|---|---|---|---|---|---|---|

| USER ID 402 | SETTING 404 | IMAGE 406 | LDSM 408 | TYPE 410 | START 442 | SPT 446 | END 444 | EPT 448 | TIMING 416 |
|---|---|---|---|---|---|---|---|---|---|

| USER ID 402 | SETTING 404 | IMAGE 406 | LDSM 408 | TYPE 410 | CENT 462 | CPT 464 | RAD 466 | RT 468 | DIR 470 | TIMING 416 |
|---|---|---|---|---|---|---|---|---|---|---|

PICTURE GESTURE AUTHENTICATION

PRIORITY INFORMATION

This application claims priority from Australian Patent Application Serial No. 2011202415, filed May 24, 2011, and further is a continuation of and claims priority under 35 U.S.C. §120 to U.S. patent application Ser. No. 13/163,201, filed on Jun. 17, 2011, the disclosure of which is incorporated by reference herein in its entirety.

BACKGROUND

A computing device, such as a laptop, a desktop, a tablet computer, a handheld device, or a server, may contain sensitive data that a user does not want disseminated to the general public. Similarly, a service, such as an e-mail account, banking service, social network, or remote work computer access, may contain data that may be damaging in malicious hands. Thus, a computing device or service may use password protection to restrict access to only authorized users who can authenticate a right of access to a user session. A login interface may query the user for a password having a series of characters, such as letters, numbers, and signs. An authentication service may deny access to the user if the characters are an improper order, if the letters are in the wrong case, or if the password fails to match the stored password in any way.

The authentication service may give the user a set number of tries at providing the password before that user is blocked from further attempts to access the computing device or service. The user may then contact an administrator to access the service or computing device, after providing some proof of identification. Such proof of identification may be a government identification or a pre-registered set of questions that presumably only the user can answer. Alternately, if the user fails to provide the proper password, a computing device or service may erase any important data.

An issue of password protection may be that a password that is complex enough to provide a proper level of protection may be too difficult for a user to remember. Most users may often use easily determined passwords like "Guest", a user's name, or other easily divinable passwords. Users that use a properly complex password may often forget the password, leading to a very frustrating user experience.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a picture signature password system may use a picture signature password to determine access to a computing device or service. A display screen may display a personalized digital image. A user input device may receive a user drawing set executed by a user over the personalized digital image. A processor may authenticate access to the user session if the user drawing set matches a library drawing set associated with the user.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 3B:
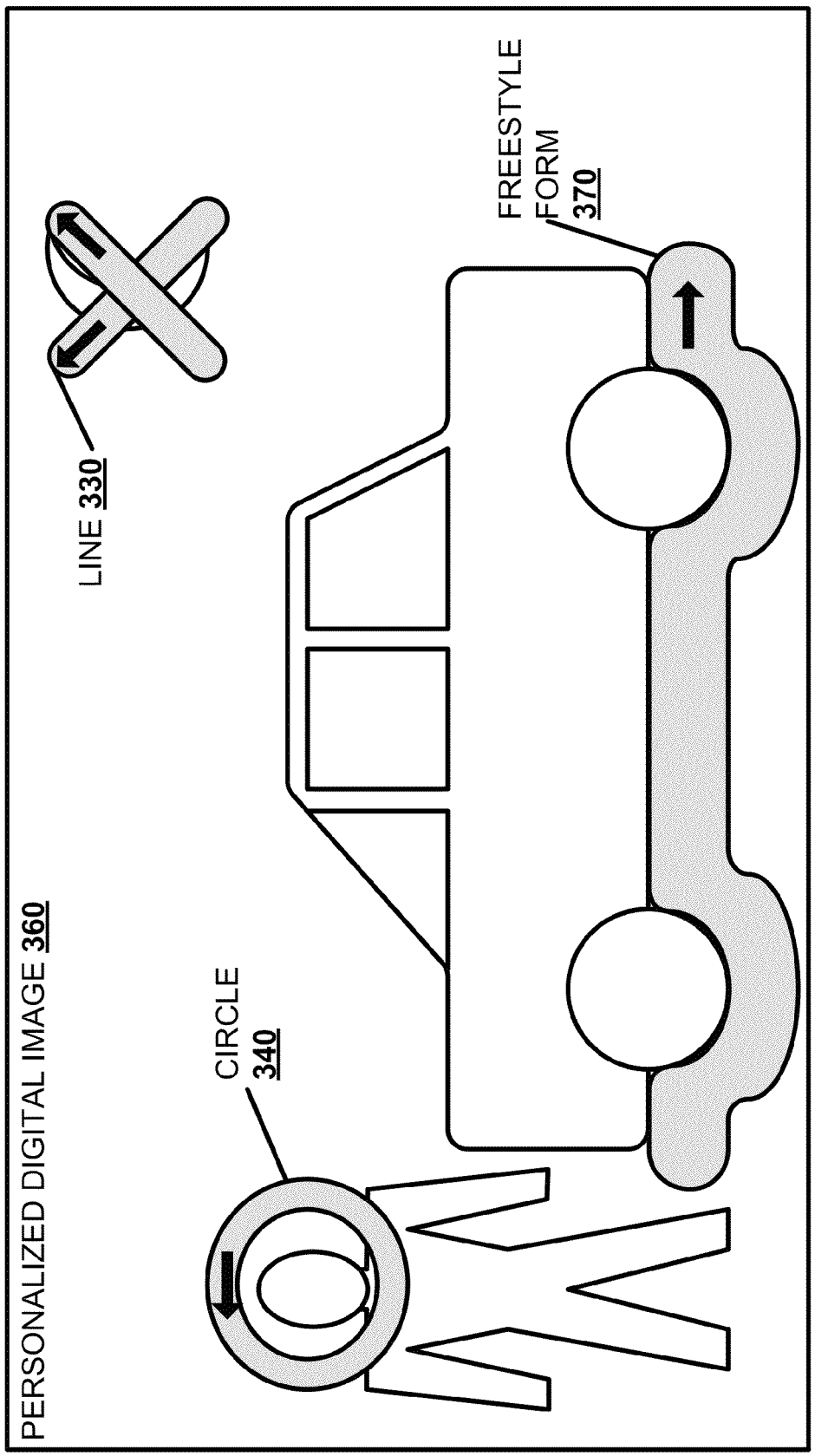

FIGS. 3a-b illustrate, in block diagrams, two picture signature passwords.

FIGS. 4a-d illustrate, in block diagrams, a library drawing set record.

Figure 5:
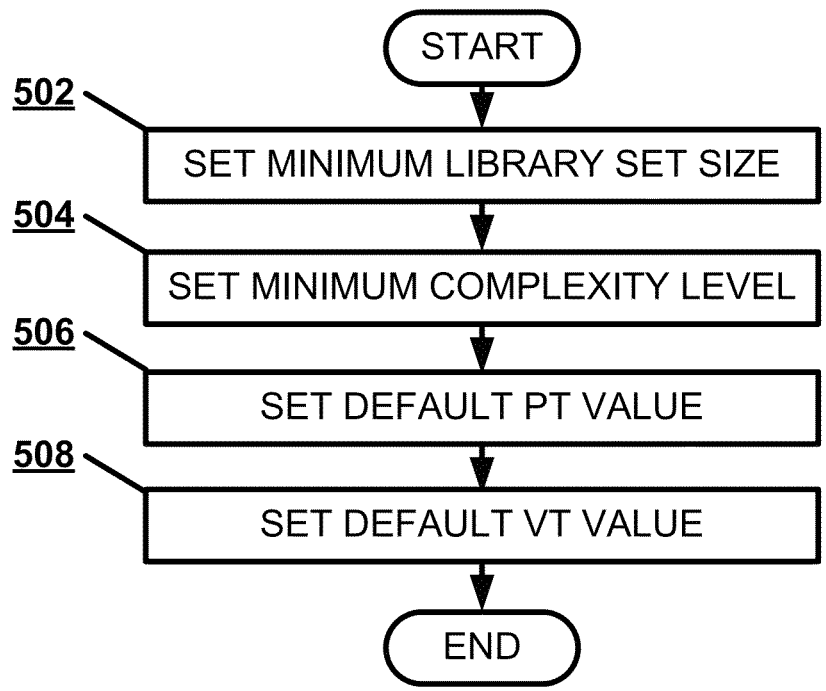

FIG. 5 illustrates, in a flowchart, one embodiment of a method of administrative preparation for an authentication service.

Figure 6:
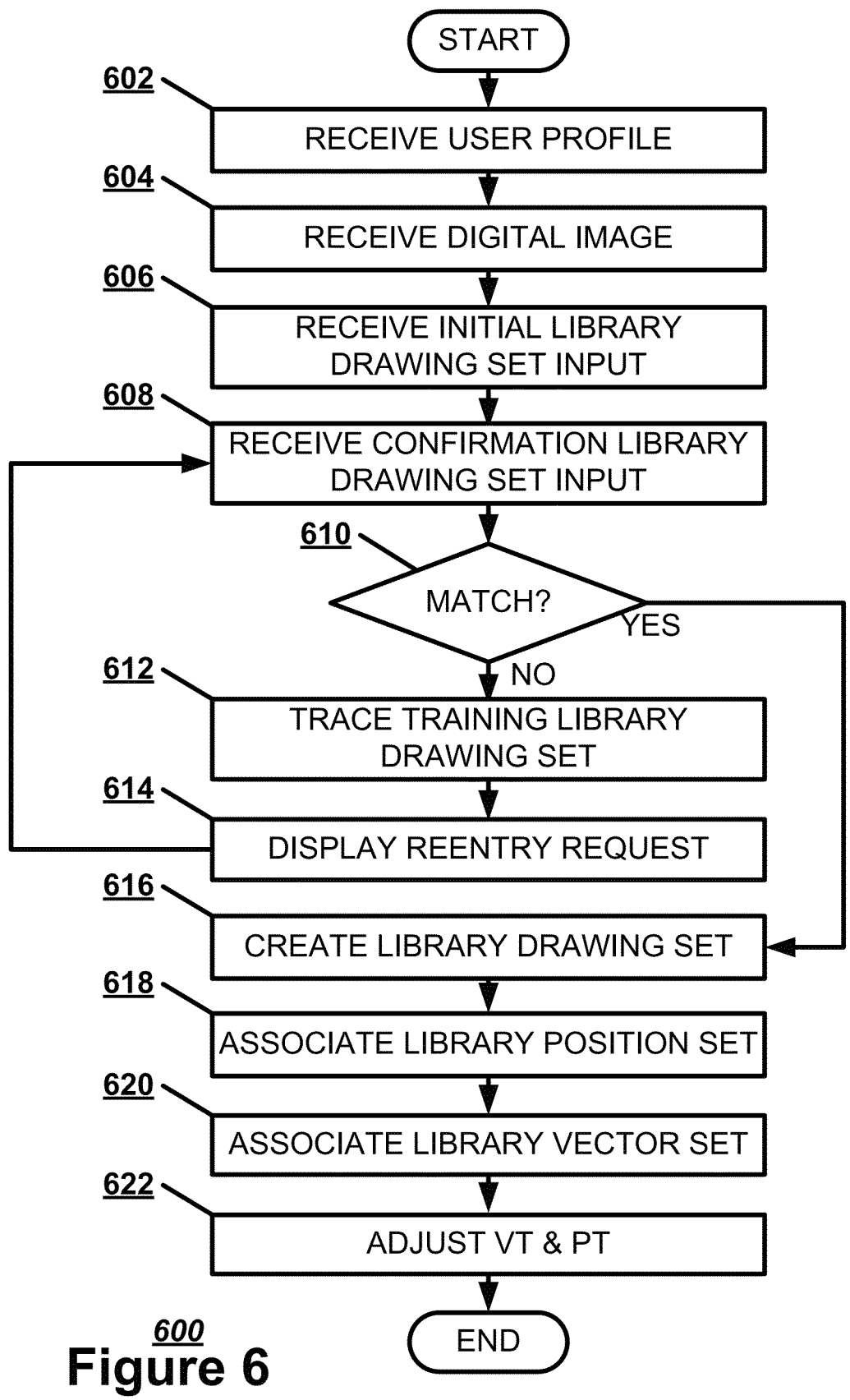

FIG. 6 illustrates, in a flowchart, one embodiment of a method of creating a library drawing set.

Figure 7:
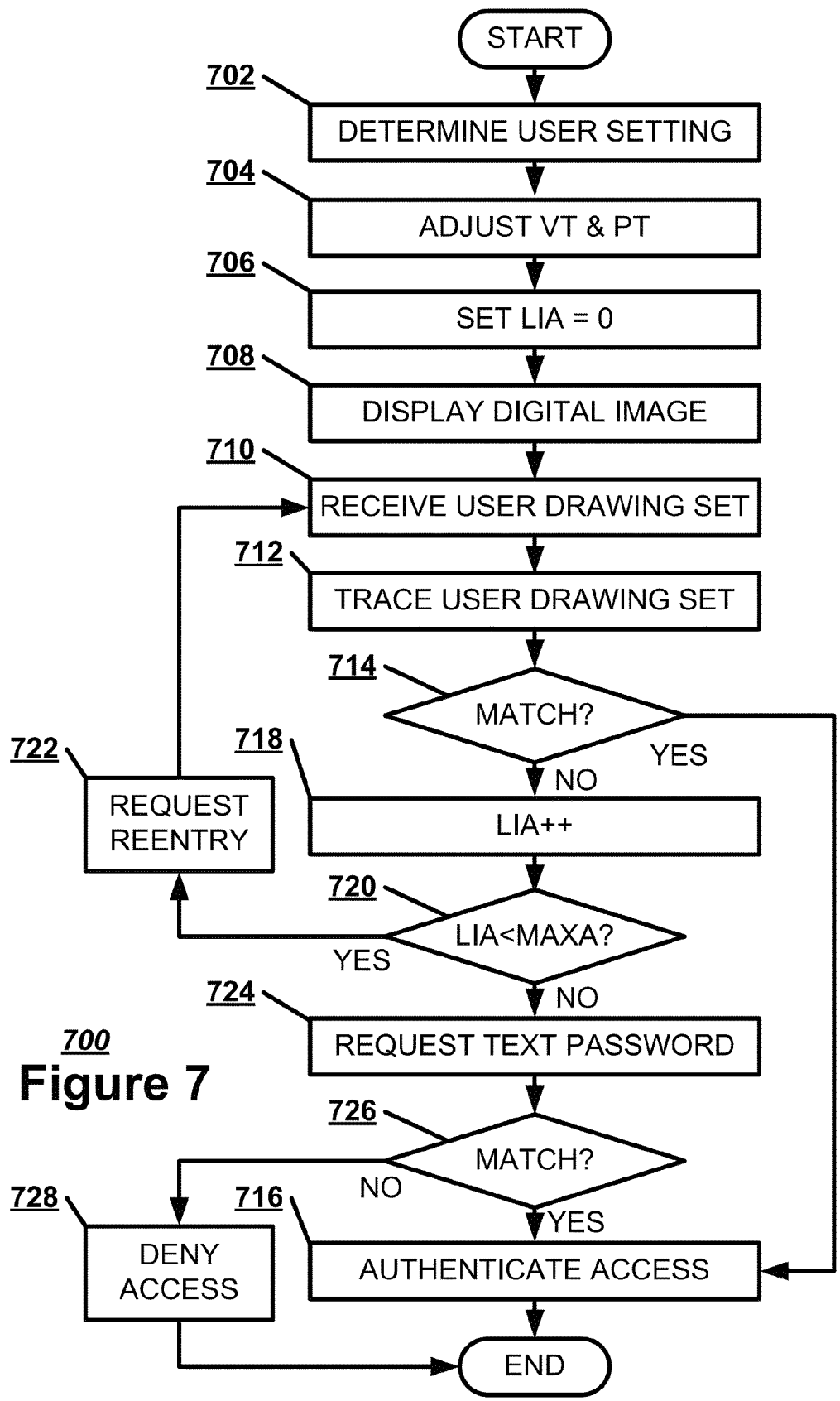

FIG. 7 illustrates, in a flowchart, one embodiment of a method of executing an authentication session.

Figure 8:
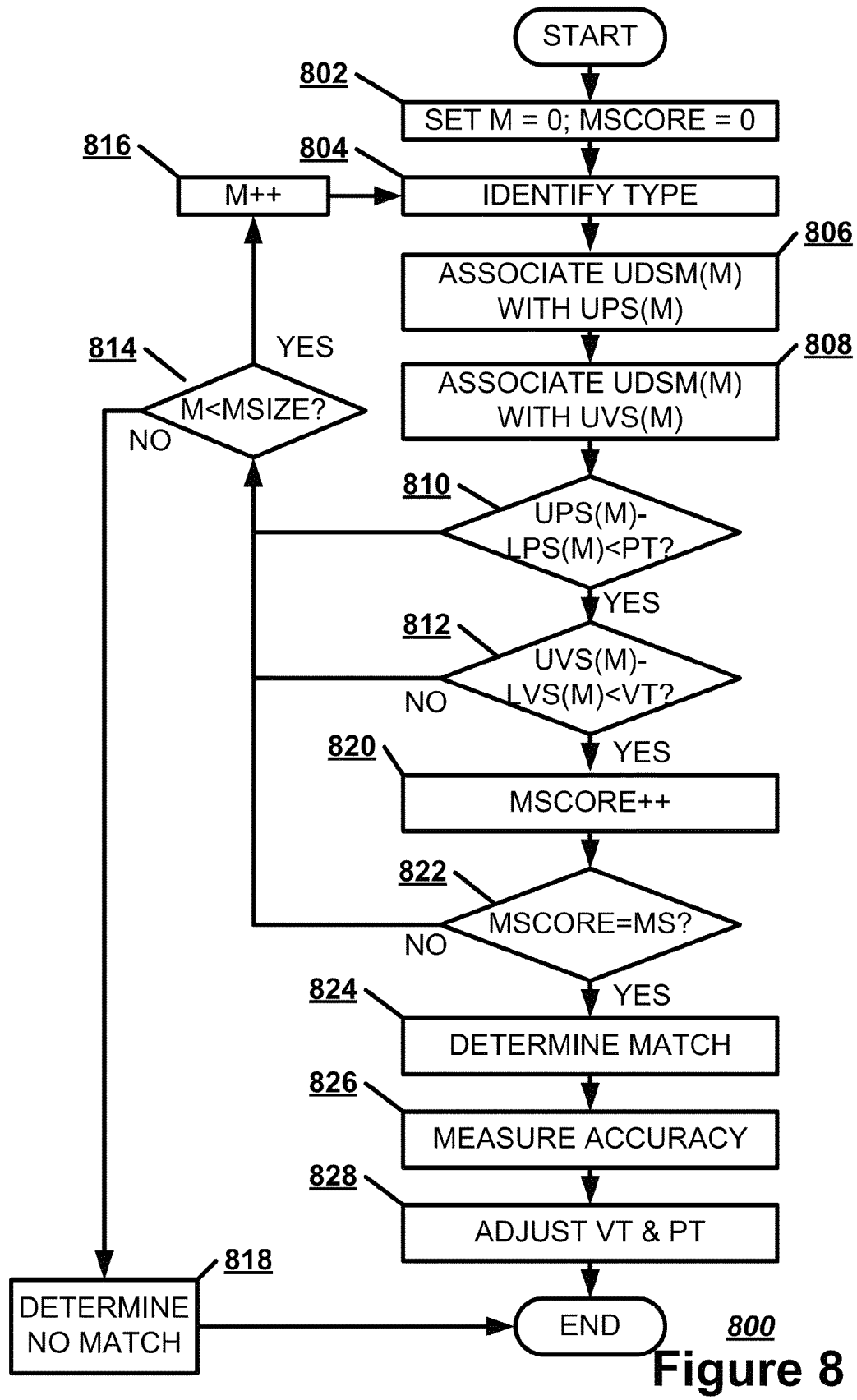

FIG. 8 illustrates, in a flowchart, one embodiment of a method for matching a user drawing set to a library drawing set on an individual member basis.

Figure 9:
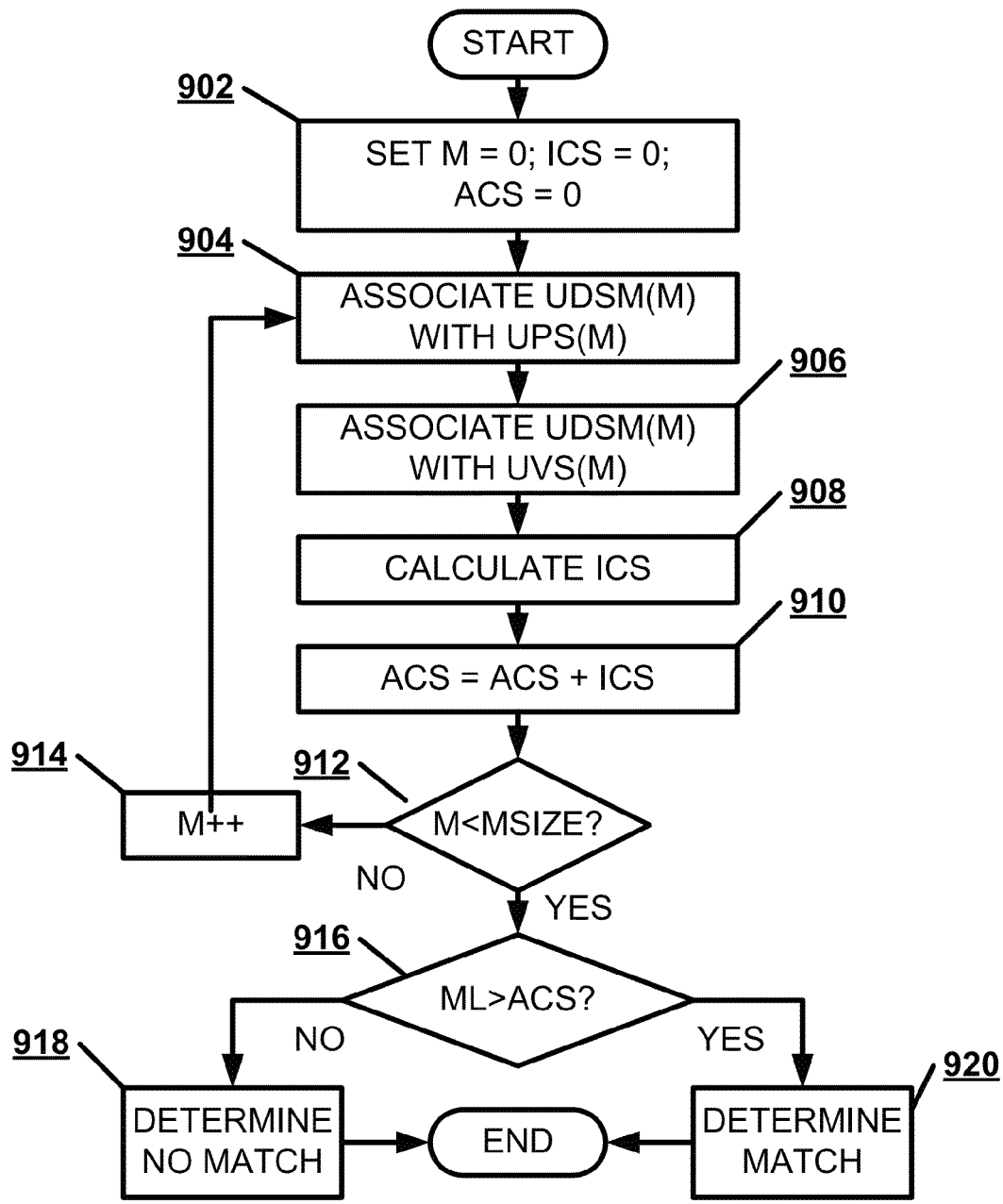

FIG. 9 illustrates, in a flowchart, one embodiment of a method for matching a user drawing set to a library drawing set on an aggregate basis.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a picture signature password system for a computing device.

A picture signature password system may increase the complexity of the authentication process while improving usability by implementing a picture signature password. A picture signature password combines a digital image with a series of user selected drawings performed over the digital image. The digital image may be further ingrained in the memory of the user by allowing the user to supply a personalized digital image from the user's own digital image library. Alternatively, the user may select the digital image from a library of default digital images provided with the authentication service. While a display with an integrated touch screen may increase the ease of use by allowing the user to directly apply the drawings with a finger, a user may also apply more traditional input methods such as a mouse, interactive stylus, or keyboard cursor control. Once authenticated, the user may use the service or computing device in a "user session", or period of authenticated use.

A simple picture signature password may apply a series of "touch points" to the digital image. The word "touch point" refers to selection of a position on the digital image, whether through a touch on a touch screen or by clicking with a mouse or other input. A more complex picture signature password may incorporate a gesture, combining selection of a set of positions with a movement. A gesture may include a simple shape, such as a circle gesture or a straight line gesture, or even more complex freestyle form gestures. A drawing is either a touch point or a gesture. A gesture set may have one or more gestures, while a drawing set may have one or more gestures or touch points. Neither the gesture set nor the drawing set is a null set.

The picture signature password system may improve usability of a picture signature password by visual representing, or "tracing", the drawing set as received over top the digital image as the user enters the drawing set. Thus, the user may check that the drawing set is being received as intended. The picture signature password system may compare the drawing set entered by the user, or "user drawing set", against a previously entered drawing set stored on the system, or "library drawing set".

In one embodiment, a picture signature password system may use a picture signature password to determine access to a computing device or service. A display screen may display a personalized digital image. A user input device may receive a user drawing set executed by a user over the personalized digital image. A processor may authenticate access to a user session if the user drawing set matches a library drawing set associated with the user.

Figure 1:
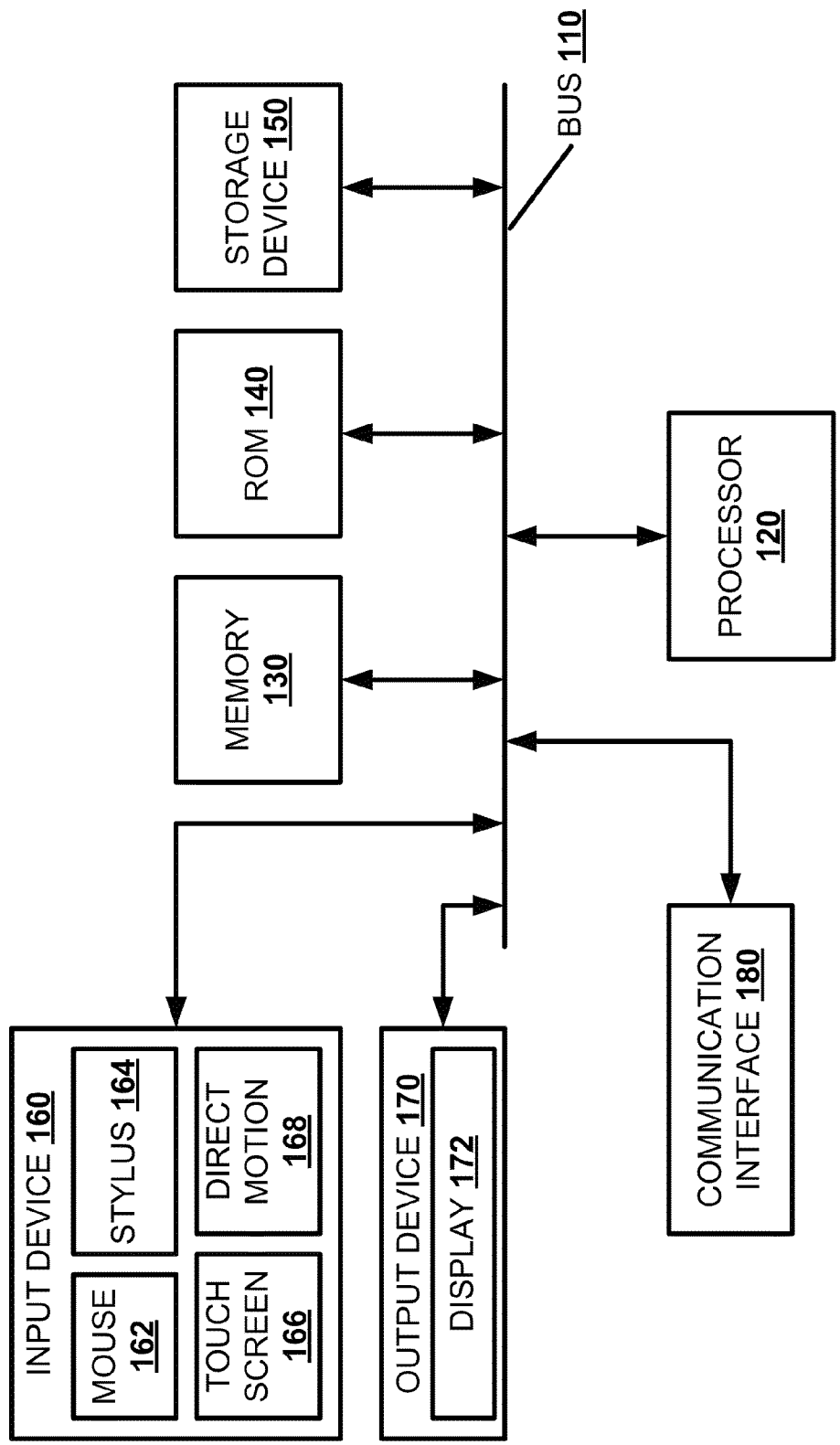
FIG. 1 illustrates a block diagram of an exemplary computing device.

FIG. 1 illustrates a block diagram of an exemplary computing device 100 which may act as a picture signature password system. The computing device 100 may include a bus 110, a processor 120, a memory 130, a read only memory (ROM) 140, a storage device 150, a user input device 160, an output device 170, and a communication interface 180. The bus 110 may permit communication among the components of the computing device 100.

The processor 120 may include at least one conventional processor or microprocessor that interprets and executes a set of instructions. The memory 130 may be a random access memory (RAM) or another type of dynamic storage device that stores information and instructions for execution by the processor 120. The memory 130 may also store temporary variables or other intermediate information used during execution of instructions by the processor 120. The ROM 140 may include a conventional ROM device or another type of static storage device that stores static information and instructions for the processor 120. The storage device 150 may include any type of tangible machine-readable medium, such as, for example, magnetic or optical recording media and its corresponding drive. The storage device 150 may store a set of instructions detailing a method that when executed by one or more processors cause the one or more processors to perform the method. The storage device 150 may also be a database or a database interface for storing a picture signature password for the user.

The user input device 160 may include one or more conventional mechanisms that permit a user to input information to the computing device 100, such as a keyboard, a mouse 162, an interactive stylus 164, a touch screen 166, a direct motion input device 168, a voice recognition device, a microphone, a headset, etc. An interactive stylus 164 is a stylus, such as a laser pen, that interacts with a display screen allowing a user to select or input data. A touch screen 166 is a display that interacts with a finger of a user to allow the user to directly select or input data. A direct motion input 168 is a camera or other image or motion capture device that may read a motion made by a user. The output device 170 may include one or more conventional mechanisms that output information to the user, including a display screen 172, a printer, one or more speakers, a headset, or a medium, such as a memory, or a magnetic or optical disk and a corresponding disk drive. The display screen 172 may have an integrated interactive touch screen 166, allowing users to select data representations on the display screen 172 by touching them. The communication interface 180 may include any transceiver-like mechanism that enables processing device 100 to communicate with other devices or networks. The communication interface 180 may include a network interface or a mobile transceiver interface. The communication interface 180 may be a wireless, wired, or optical interface. In one embodiment, the communication interface 180 may include a universal serial bus (USB) interface, a Bluetooth® interface, or other such interface that may be used to attach peripheral devices or pair other computing devices.

The computing device 100 may perform such functions in response to a processor 120 executing sequences of instructions contained in a computer-readable medium, such as, for example, the memory 130, a magnetic disk, or an optical disk. Such instructions may be read into the memory 130 from another computer-readable medium, such as the storage device 150, or from a separate device via the communication interface 180.

Figure 2:
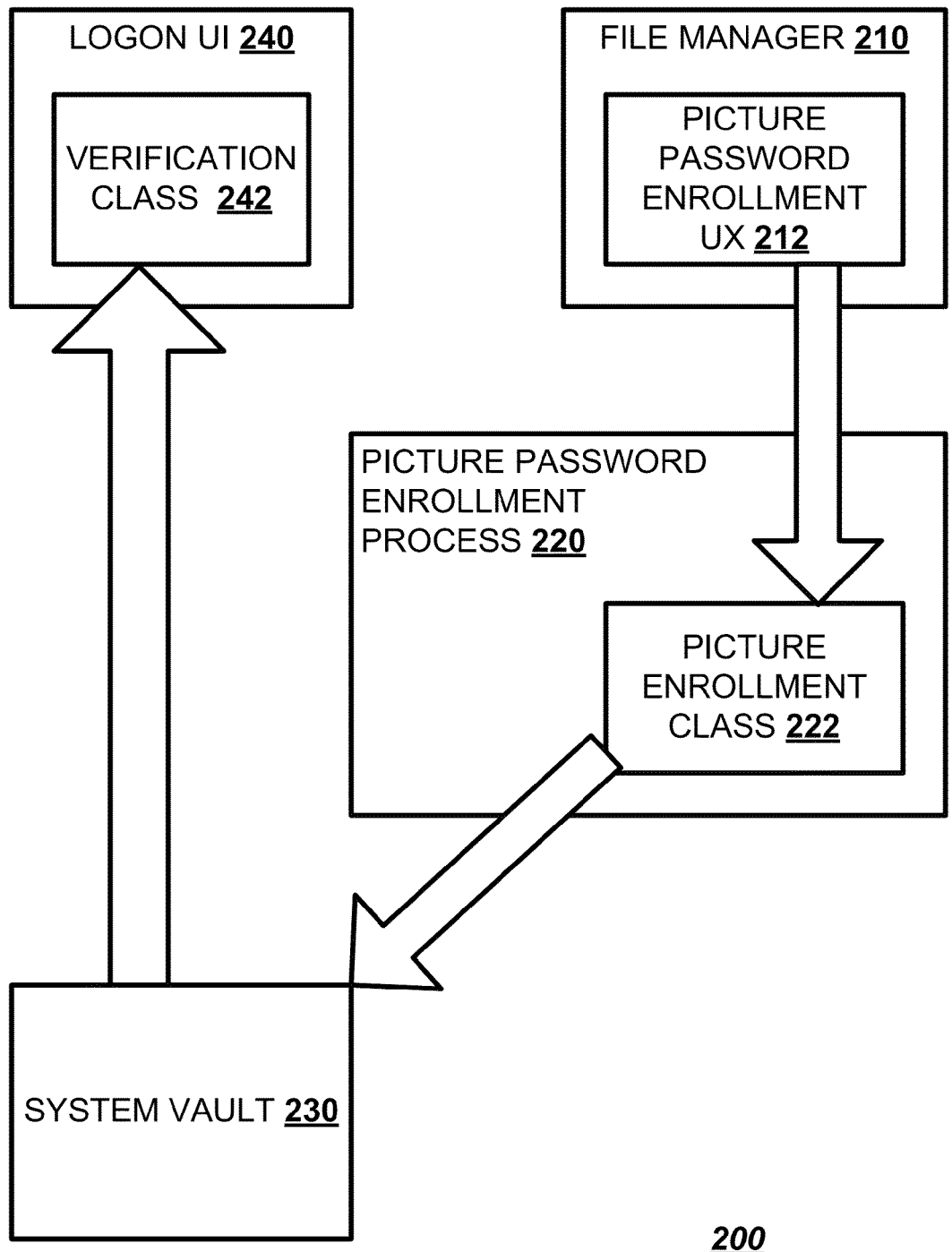
FIG. 2 illustrates, in a block diagram, an authentication service.

FIG. 2 illustrates, in a block diagram, an authentication service 200 run by a picture signature password system. The first time that a user accesses a computing device or a service, the user may provide a set of authentication information. A file manager user process 210 may implement a picture password enrollment user experience (UX) 212 to collect a text password, an image path, and a drawing set. The text password is a standard text password that the user selects to access a user session with a computing device or a service. The image path identifies a digital image selected by the user as a prompt for the picture password. The digital image may be selected from a library of default digital images and or may be a personalized digital image selected from a digital image library provided by the user. The drawing set is a unique series of one or more touch points or gestures performed over the digital image to uniquely identify the user.

The picture password enrollment user experience 212 may send the text password, image path, and drawing set to a picture password enrollment local process 220 executing a picture enrollment class 222. The picture enrollment class 222 may process the drawing set and digital image to create the picture signature password. The picture enrollment class 222 may send the picture signature password and the text password to a system vault 230 which securely stores that data.

The next time that a user seeks to authenticate a session, a login user interface (UI) local process 240 may execute a picture verification class 242 to receive the authentication information from the user. The picture verification class 242 may retrieve the picture signature password and the text password from the system vault 230. The picture verification class 242 may prompt the user to complete the picture signature password by presenting the digital image to the user. The user may enter a user drawing set to be applied to the digital image to create the picture signature password. If the user fails to properly complete the picture signature password, then the picture verification class 242 may prompt the user for the text password.

A picture signature password system may implement the authentication service 200. FIG. 3a illustrates, in a block diagram, one embodiment of a first picture signature password 300. The picture signature password system may prompt the user with a digital image 310 to provide the picture signature password. The authentication service may display on a display screen 172 or a touch screen 166 a digital image 310. The digital image 310 may be a personalized digital image 310 to increase familiarity to the user. The user may input a drawing set via the touch screen 166, a direct motion input 168, a mouse 162, an interactive stylus 164, or other input device 160.

The drawing set may be superimposed on the personalized digital image. The drawing set may include a series of one or more touch points 320 or gestures. A touch point 320 is a touch on a touch screen 166 or a cursor click from another input device 160 at a point on the personalized digital image 310. A touch point 320 has position but no movement vector. Conversely, a gesture has a position and a movement vector. A gesture may be a line gesture 330, circle gesture 340, or freestyle form gesture.

For example, as shown in FIG. 3*a*, a personalized digital image 310 may show three people. A user may apply touch points to one person on the shoulder, hand, and foot. The user may draw two line gestures 330 downward on the second person, creating a cross on the chest. The user may draw a circle gesture 340 on the head of the third person in a clockwise motion.

A second example of a picture signature password 350 is shown in FIG. 3*b*. The personalized digital image 360, in the second example, may have a person next to car under a crescent moon. A user may draw a circle gesture 340 on the head of the person in a counterclockwise motion. The user may draw two upward line gestures 330 to cross out the crescent moon. The user may draw a freestyle form gesture 370 by tracing the underside of the car.

A library drawing set is a drawing set stored with the picture signature password system after initial input by the user upon creating an account with a computing device or a service. Additionally, a user drawing set is a drawing set entered to access a session once an account has been created. The library drawing set may be stored in the system vault 230 as a library drawing set record.

Whether a library drawing set or a user drawing set, each member of a drawing set may be identified by a set of position data. The position data set indicates where the user has touched or clicked. For a touch screen, the position data set may include all points touched by the finger of the user, or a representative point, such as the center of the finger.

Similarly, each gesture may be identified by a set of position data and a set of vector data. The vector data set indicates the direction the user moves that touch or click. For a touch point, the vector data set is empty, as no movement occurs.

Additionally, each member of a drawing set may be associated with a set of timing data. For a touch point, the set of timing data may indicate the duration of entry of the touch point. For a gesture, the set of timing data may indicate the speed of entry of the gesture.

For specific drawing types, the picture signature password may use a specific data storage format to represent a library drawing set member. For example, a touch point 320 may be represented by a touch point library drawing set record 400, as shown in FIG. 4*a*. Further, a gesture may be represented by a general library gesture set record 420, as shown in FIG. 4*b*. Alternately, a line gesture 330 may be represented by a line library gesture set record 440, as shown in FIG. 4*c*. A circle gesture 340 may be represented by a circle library gesture set record 460, as shown in FIG. 4*d*.

The library drawing set record may have a user identification (ID) 402 to identify the user associated with the library drawing set. The library drawing set record may have a user setting identifier 404 allowing different picture signature passwords or different tolerances for different settings. The user setting describes the location of the user, such as a home location, a work location, or a public location. For example, the picture signature password system may have a user more strictly recreate the library drawing set if the user is accessing the system from a public location as opposed to a home location. The library drawing set record may have an image identifier 406 to identify the digital image that acts as a prompt for the user.

The library drawing set record may have a library drawing set member (LDSM) field 408 identifying a member of the library drawing set. The library drawing set record may have a type field 410 that identifies the library drawing set member 408 as a touch point 320, line gesture 330, circle gesture 340, or freestyle form gesture 370.

A touch point library drawing set record 400 or a general library gesture set record 420 may have a library position set (LPS) field 412 associated with the graphic coordinates of the library drawing set member. The library position set field 412 may indicate points at a pixel or sensor level. The library position set field 412 may have an associated position tolerance (PT) field 414 representing a position tolerance value. The position tolerance value indicates how far the user position set associated with a user drawing set may be from the library position set while still considered to match the library position set.

The library drawing set record may have a timing data set field 416 associated with the speed of entry or duration of entry of the library drawing set member. For a touch point library drawing set record, the timing data set field 416 may indicate the duration that a touch point is held. For a general library drawing set record 420, the timing data set field 416 may indicate the speed that a gesture is entered. The timing data set field 416 may also be used to indicate whether a first member of a drawing set is to be entered concurrent with a second member of the drawing set. For example, a user may hold a touch point 320 while entering a circle gesture 340.

The general library gesture set record 420 may have a library vector set (LVS) field 422 associated with the direction of the library drawing set member. The library vector set field 422 may have an associated vector tolerance (VT) field 424 representing a vector tolerance value. The vector tolerance value indicates how far the user vector set associated with a user drawing set may be from the library vector set while still considered to match the library vector set. The general library gesture set record 420 may be used to indicate a touch point 320 by setting the library vector set field 422 to zero.

For a line gesture 330, a line library gesture set record 440 may store a start point field 442 indicating the beginning of the line gesture 330 and an end point field 444 indicating the end of the line gesture 330, with points in between implied. The start point field 442 may have an associated start point tolerance (SPT) field 446 representing a start point tolerance value and the end point field 444 may have an associated end point tolerance (EPT) field 448 representing an end point tolerance value. The start point tolerance value and the end point tolerance value indicate how far the user start point and user end point associated with a user line gesture 330 may be from the library line gesture 330 while still considered to match the library line gesture 330.

For circle gestures 340, the circle library gesture set record 460 may store a center point field 462 indicating the center of the circle gesture 340. The center point field 462 may have an associated center point tolerance (CPT) field 464 representing a center point tolerance value. The center point tolerance value indicates how far the user center point associated with a user circle gesture 340 may be from the library circle gesture 340 while still considered to match the library circle gesture 340. The circle library gesture set record 460 may store a radius field 466 indicating the radius of the library circle gesture 340. The radius field 466 may have an associated radius tolerance (RT) field 468 representing a radius tolerance value. The radius tolerance value indicates how far the user radius associated with a user circle gesture 340 may be from the library circle gesture 340 while still considered to match the library circle gesture 340. The circle library gesture set record 460 may store a direction field (DIR) 470 indicating the direction that the circle gesture 340 is drawn, such as clockwise or counterclockwise.

FIG. 5 illustrates, in a flowchart, one embodiment of a method 500 of administrative preparation for an authentication service. The picture signature password system may administratively set default parameters that the user may follow when using the authentication service 200. The picture signature password system may set a minimum library set size for a library drawing set associated with the user (Block 502). The minimum library set size indicates the minimum number of library drawing set members the user enters to create a viable picture signature password. For example, a service administrator may make the user enter at least three unique drawing set members. The picture signature password system may set a minimum complexity level for a library drawing set associated with the user (Block 504). The minimum complexity level indicates the complexity of the library drawing set. Complexity may be determined by drawing repetition and individual drawing complexity, with a touch point 320 being the simplest and the freestyle form gesture 370 being the most complex. For example, the service administrator may make the user enter a line gesture 330, a circle gesture 340, and a freestyle form gesture 370, with minimal repetition of drawing type. The picture signature password system may set a default position tolerance value to be associated with a library drawing set member (Block 506). The picture signature password system may set a default vector tolerance value to be associated with a library drawing set member (Block 508).

FIG. 6 illustrates, in a flowchart, one embodiment of a method 600 of creating a library drawing set. The picture signature password system may receive a user profile from the user (Block 602). The user profile may indicate if a person is an adult or a child. The picture signature password system may receive a digital image from a personalized digital image library provided by the user (Block 604). The picture signature password system may receive an initial library drawing set input from the user (Block 606). The picture signature password system may receive a confirmation library drawing set input from the user (Block 608). The user enters the confirmation library drawing set input to demonstrate the ability to enter a drawing set with some degree of consistency. If the confirmation library drawing set input does not match the initial library drawing set input (Block 610), the picture signature password system may trace a training library drawing set to the user (Block 612). The training library drawing set is the initial library drawing set input visually represented, or "traced", over top the digital image. The picture signature password system may display a reentry request to the user after tracing the training library drawing set (Block 614).

If the confirmation library drawing set input matches the initial library drawing set input (Block 610), the picture signature password system may create a library drawing set from the initial library drawing set input (Block 616). The picture signature password system may associate a library drawing set member with a library position set (Block 618). The picture signature password system may associate a library drawing set member with a library vector set (Block 620). The picture signature password system may adjust the position tolerance value for the library position set and the vector tolerance value for the library vector set based on the user profile (Block 622). For example, a child may be given greater tolerance than an adult in recreating the drawing set as a user drawing set.

FIG. 7 illustrates, in a flowchart, one embodiment of a method 700 of executing an authentication session. The picture signature password system may determine a user setting, such as determining if the user is accessing the authentication service 200 from a work location, public location, or home location (Block 702). The picture signature password system may adjust the position tolerance values and the vector tolerance values based on that user setting (Block 704). The picture signature password system may initialize a login attempt (LIA) counter to zero (Block 706). The picture signature password system may display a personalized digital image on a display screen 172 (Block 708). The picture signature password system may receive a user drawing set executed by a user over the personalized digital image (Block 710).

The user drawing set may include a user touch point, a user circle gesture, a user line gesture, or a user freestyle form gesture. To increase complexity, the picture signature password system may have the user drawing set have at least one user gesture. The user gesture may be a user circle gesture, a user line gesture, or a user freestyle form gesture. For even higher complexity, the picture signature password system may receive a user gesture set executed by a user over a digital image. The user gesture set may include a user circle gesture, a user line gesture, or a user freestyle form gesture.

The picture signature password system may trace the user drawing set onto the personalized digital image, to illustrate to the user where the user is drawing (Block 712). If the user drawing set matches a library drawing set associated with the user (Block 714), then the picture signature password system may authenticate access to the user session (Block 716). If the user drawing set does not match a library drawing set associated with the user (Block 714), the login attempt counter is incremented (Block 718). If the login attempt counter is less than the maximum number of allowed attempts (MAXA) (Block 720), the picture signature password system may request reentry of the user drawing set (Block 722). If the login attempt counter exceeds the maximum number of allowed attempts (Block 720), the picture signature password system may request a text password (Block 724). If the text password matches the library text password associated with the user (Block 726), then the picture signature password system may authenticate access to the user session (Block 716). If the text password does not match the library text password associated with the user (Block 726), then the picture signature password system may deny access to the user session (Block 728).

FIG. 8 illustrates, in a flowchart, one embodiment of a method 800 for matching a user drawing set to a library drawing set on an individual member basis. The picture signature password system may initialize a member identifier (M) to zero and a member score (MSCORE) to zero (Block 802). The picture signature password system may identify the drawing type that best matches a user drawing set member to determine which library drawing set member better compares to that user drawing set member (Block 804). The picture signature password system may associate the user drawing set member with a user position set (Block 806). The picture signature password system may associate the user drawing set member with a user vector set (Block 808). If the user position set is not within the position tolerance value of the library position set (Block 810) or the user vector set is not within the vector tolerance value of the library vector set (Block 812), and the member identifier is less than the library set size (MSIZE) (Block 814), the picture signature password system increments the member identifier to the next user drawing set member (Block 816). If the member identifier is greater than or equal to the library set size (Block 814), the picture signature password system determines that no match has occurred (Block 818). If the user position set is within the position tolerance value of the library position set (Block 810) and the user vector set is within the vector tolerance value of the library vector set (Block 812), the picture signature password system increments the member score to indicate that the user drawing set member and the library drawing set member match (Block 820).

If the member score equals a matching score (MS) (Block 822), the picture signature password system may determine the user drawing set and the library drawing set match (Block 824). The matching score may not indicate that every member of a user drawing set matches, as the picture signature password system may determine that the user drawing set matches the library drawing with a majority of user drawing set members matching a majority of library drawing set members. Thus, for example, if a user accurately enters three out of four user drawing set members, the user may be given greater leeway on the fourth and final user drawing set member. The last user drawing set member may be ignored or have the tolerance values for that user drawing set member increased. The picture signature password system may measure the user accuracy in using the authentication service (Block 826). The picture signature password system may adjust the position tolerance value and the vector tolerance value based on the user accuracy (Block 828). Thus, if a user is consistently shown to be highly accurate when entering the user drawing set, the tolerance values for that user may be decreased over time to improve security.

Alternately, a picture signature password system may calculate an individual comparison score for a user drawing set member based on proximity to the library drawing set member. The picture signature password system may aggregate the individual comparison score for each user drawing set member into an aggregate comparison score. The aggregate comparison score represents the total deviation of the user drawing set from the library drawing set. If the aggregate comparison score exceeds a maximum limit for deviation, then the picture signature password system may determine that the user drawing set matches the library drawing set. Thus the picture signature password may determine that the user drawing set matches the library drawing set based on an aggregate comparison score for the entire user drawing set, rather than on an individual user drawing set member basis.

FIG. 9 illustrates, in a flowchart, one embodiment of a method 900 for matching a user drawing set to a library drawing set on an aggregate basis. The picture signature password system may initialize a member identifier, an individual comparison score (ICS), and an aggregate comparison score (ACS) to zero (Block 902). The picture signature password system may associate a user drawing set member with a user position set (Block 904). The picture signature password system may associate a user drawing set member with a user vector set (Block 906). The picture signature password system may calculate an individual comparison score for the user drawing set member based on vector and position distance from the corresponding library drawing set member (Block 908). The picture signature password system may add the individual comparison score to the aggregate comparison score (Block 910). If the member identifier is smaller than the library set size (Block 912), the picture signature password system increments the member identifier to the next user drawing set member (Block 914). If the member identifier is greater than or equal to the library set size (Block 912), the aggregate comparison score is compared with a matching limit (ML) indicating the maximum allowable limit between the user drawing set and the library drawing set. If the aggregate comparison score is greater than or equal to the matching limit (Block 916), the picture signature password system may determine the user drawing set and the library drawing set do not match (Block 918). If the aggregate comparison score is less than the matching limit (Block 916), the picture signature password system may determine the user drawing set and the library drawing set match (Block 920).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method for authenticating a user session associated with a user, comprising:
   displaying a personalized digital image on a display screen;
   receiving a user drawing set superimposed on the personalized digital image, the user drawing set including multiple drawing set members, at least two of the multiple drawing set members comprising:
     a user touch point indicating a position associated with the personalized digital image,
     a user circle gesture indicating a first set of positions associated with the personalized digital image,
     a user freestyle form gesture indicating a second set of positions associated with the personalized digital image, or
     a user line gesture indicating a third set of positions associated with the personalized digital image; and
   authenticating access to the user session if the position, the first set of positions, the second set of positions, or the third set of positions of the at least two of the multiple drawing set members of the user drawing set matches a library drawing set associated with the user.

2. The method of claim 1, further comprising:
   tracing the user drawing set onto the personalized digital image.

3. The method of claim 1, wherein the multiple drawing set members of the user drawing set include three or more of the user touch point, the user circle gesture, the user freestyle form gesture, or the user line gesture.

4. The method of claim 1, further comprising:
   receiving an initial library drawing set input; and
   creating the library drawing set from the initial library drawing set input.

5. The method of claim 4, further comprising:
   receiving a confirmation library drawing set input; and
   displaying a reentry request if the confirmation library drawing set input does not match the initial library drawing set input.

6. The method of claim 5, further comprising:
   tracing a training library drawing set if the confirmation library drawing set input does not match the initial library drawing set input.

7. The method of claim 1, further comprising:
   requesting reentry of the user drawing set if the user drawing set does not match the library drawing set associated with the user.

8. The method of claim 1, further comprising:
   requesting a text password if the user drawing set does not match the library drawing set associated with the user.

9. The method of claim 1, wherein authenticating access to the user session is responsive to determining that each of the multiple user drawing set members match, within a position tolerance value, one of multiple library drawing set members.

10. The method of claim 1, wherein authenticating access to the user session is responsive to determining that one of the multiple user drawing set members matches, within a vector tolerance value, one of multiple library drawing set members.

11. The method of claim 10, further comprising:
    adjusting the vector tolerance value based on a user accuracy, a user profile, or a user setting.

12. The method of claim 1, further comprising:
    associating a library drawing set member with a set of timing data indicating a duration of entry, or a speed of entry, of the user touch point, the user circle gesture, the user freestyle form gesture, or the user line gesture for the user drawing set, and
    wherein authenticating access to the user session is responsive to determining that timing of one of the multiple user drawing set members matches the set of timing data for one of multiple library drawing set members.

13. The method of claim 1, further comprising:
    determining that the user drawing set matches the library drawing set if a majority of the multiple user drawing set members matches a majority of library drawing set members.

14. The method of claim 1, further comprising:
    determining that the user drawing set matches the library drawing set based on an aggregate comparison score.

15. One or more computer-readable-media storage devices comprising a set of instructions stored thereon that, responsive to execution by one or more processors, cause the one or more processors to perform operations comprising:
    displaying a digital image on a display screen, the digital image associated with a user;
    receiving a user drawing set via superimposition over the digital image on the display screen, the user drawing set having multiple user gestures, the multiple user gestures including at least two of:
      a user touch point indicating a position associated with the digital image;
      a user circle gesture indicating a first set of positions associated with the digital image;
      a user line gesture indicating a second set of positions associated with the digital image; or
      a user freestyle form gesture indicating a third set of positions associated with the digital image; and
    authenticating access to a user session if at least two of the position, the first set of positions, the second set of positions, or the third set of positions associated with the multiple user gestures of the user drawing set match a library drawing set associated with the user.

16. One or more computer-readable-media storage devices as recited in claim 15, wherein the multiple user gestures at least include the user freestyle form gesture.

17. One or more computer-readable-media storage devices as recited in claim 15, wherein the operations further comprise:
    receiving the digital image from a digital image library associated with the user.

18. One or more computer-readable-media storage devices as recited in claim 15, wherein the operations further comprise:
    setting a minimum library set size and a minimum complexity level for the library drawing set.

19. A picture signature password system, comprising:
    a display screen to display a digital image associated with a user;
    a user input device to receive a user drawing set superimposed over the digital image associated with the user and displayed on the display screen, the user drawing set having at least two user gestures, two of the user gestures being:
      a touch point indicating a position associated with the digital image,
      a circle gesture indicating a first set of positions associated with the digital image,
      a line gesture indicating a second set of positions associated with the digital image,
      or a freestyle form gesture indicating a third set of positions associated with the digital image; and a processor to execute a set of instructions to authenticate access to a user session if positions associated with the digital image indicated through the at least two user gestures of the user drawing set match a library drawing set associated with the user.

20. The picture signature password system of claim 19, wherein the user input device is an interactive stylus, a mouse, a direct motion input, or a touch screen, the touch screen integrated into the display screen.

* * * * *